(12) United States Patent
Krampe et al.

(10) Patent No.: US 11,280,335 B2
(45) Date of Patent: Mar. 22, 2022

(54) ROTARY PISTON PUMP HAVING A SEALING CHAMBER SEAL

(71) Applicant: VOGELSANG GMBH & CO. KG, Essen (DE)

(72) Inventors: Paul Krampe, Essen (DE); Torsten Burhorst, Essen (DE)

(73) Assignee: VOGELSANG GMBH & CO. KG, Essen (DE)

( * ) Notice: Subject to any disclaimer, the term of this patent is extended or adjusted under 35 U.S.C. 154(b) by 183 days.

(21) Appl. No.: 16/345,955

(22) PCT Filed: Oct. 23, 2017

(86) PCT No.: PCT/EP2017/076956
§ 371 (c)(1),
(2) Date: Apr. 29, 2019

(87) PCT Pub. No.: WO2018/077778
PCT Pub. Date: May 3, 2018

(65) Prior Publication Data
US 2019/0301454 A1    Oct. 3, 2019

(30) Foreign Application Priority Data
Oct. 31, 2016    (DE) .......................... 202016106107.5

(51) Int. Cl.
*F01C 19/00*    (2006.01)
*F03C 2/00*    (2006.01)
(Continued)

(52) U.S. Cl.
CPC .......... *F04C 15/0038* (2013.01); *F04C 2/082* (2013.01); *F04C 2/12* (2013.01);
(Continued)

(58) Field of Classification Search
CPC .... F04C 2/082; F04C 2/12; F04C 2/16; F04C 15/0038; F04C 2270/18; F04C 2270/185;
(Continued)

(56) References Cited

U.S. PATENT DOCUMENTS 2,362,106 A     11/1944  Ungar et al.
3,734,653 A  *  5/1973  Edstrom ................. F04C 29/02
                                                        418/88
(Continued)

FOREIGN PATENT DOCUMENTS

CN     101784824    7/2010
CN     102066760    5/2011
(Continued)

*Primary Examiner* — Theresa Trieu
(74) *Attorney, Agent, or Firm* — Price Heneveld LLP

(57) ABSTRACT

A seal assembly for sealing a pump shaft in a rotary piston pump configured for conveying pump-conveyed fluid comprises a sealing-fluid pump device having a pump inlet and a pump outlet. A blocking chamber is connected to the pump outlet and is disposed so as to neighbor the pump chamber of the rotary piston pump and is sealed in relation to the pump chamber by means of a first shaft seal that encloses the pump shaft. The blocking chamber by way of the pump outlet is impinged with a fluid pressure resulting from the fluid pressure differential that is generated by the sealing-fluid pump device, whereby said fluid pressure interacts with the first seal assembly to seal the pump chamber in relation to the egress of pump-conveyed fluid from the pump chamber along the pump shaft.

29 Claims, 8 Drawing Sheets

(51) Int. Cl.
*F03C 4/00* (2006.01)
*F04C 2/00* (2006.01)
*F04C 15/00* (2006.01)
*F04C 2/12* (2006.01)
*F16J 15/34* (2006.01)
*F04C 2/08* (2006.01)

(52) U.S. Cl.
CPC ....... *F16J 15/342* (2013.01); *F04C 2270/185* (2013.01); *F04C 2270/215* (2013.01)

(58) Field of Classification Search
CPC ............. F04C 2270/21; F04C 2270/215; F16J 15/342; F16J 15/3464; F16J 15/348
See application file for complete search history.

(56) References Cited

U.S. PATENT DOCUMENTS

| | | | | |
|---|---|---|---|---|
| 3,759,636 | A * | 9/1973 | Schaefer | F04C 29/02 418/84 |
| 4,313,714 | A | 2/1982 | Kubeczka | |
| 4,538,821 | A * | 9/1985 | Wallace | F16J 15/348 277/374 |
| 5,370,514 | A * | 12/1994 | Morita | F04C 15/0061 418/206.1 |
| 5,489,105 | A * | 2/1996 | Attenasio | F16J 15/3464 277/370 |
| 5,556,271 | A * | 9/1996 | Zuercher | F04C 28/125 418/201.2 |
| 6,149,408 | A * | 11/2000 | Holt | F04C 29/026 418/98 |
| 6,213,473 | B1 * | 4/2001 | Lebeck | F16J 15/342 277/399 |
| 6,471,492 | B2 * | 10/2002 | Nishimura | F04C 18/16 418/201.1 |
| 2008/0170958 | A1 | 7/2008 | Prior et al. | |
| 2010/0028165 | A1 * | 2/2010 | Kameya | F04C 18/16 418/201.1 |
| 2010/0189583 | A1 | 7/2010 | Cacard et al. | |
| 2011/0076174 | A1 | 3/2011 | Kakiuchi et al. | |
| 2014/0294648 | A1 * | 10/2014 | Krampe | F04C 15/0026 418/206.6 |
| 2017/0306949 | A1 | 10/2017 | Weigl et al. | |

FOREIGN PATENT DOCUMENTS

| | | |
|---|---|---|
| CN | 102959245 | 3/2013 |
| CN | 205560234 | 9/2016 |
| DE | 1787079 | 4/1959 |
| DE | 3007267 | 9/1981 |
| DE | 8107699 | 9/1982 |
| DE | 3714243 | 11/1987 |
| DE | 3916339 | 11/1990 |
| DE | 19806657 | 9/1999 |
| EP | 0814267 | 12/1997 |
| EP | 1300592 | 4/2003 |
| EP | 2306027 | 4/2011 |
| FR | 746768 | 6/1933 |
| GB | 2395532 | 5/2004 |
| JP | 2009299584 | 12/2009 |
| WO | 8908798 | 9/1989 |
| WO | 2004053296 | 6/2004 |
| WO | 2014151057 | 9/2014 |
| WO | 2016082814 | 6/2016 |

\* cited by examiner

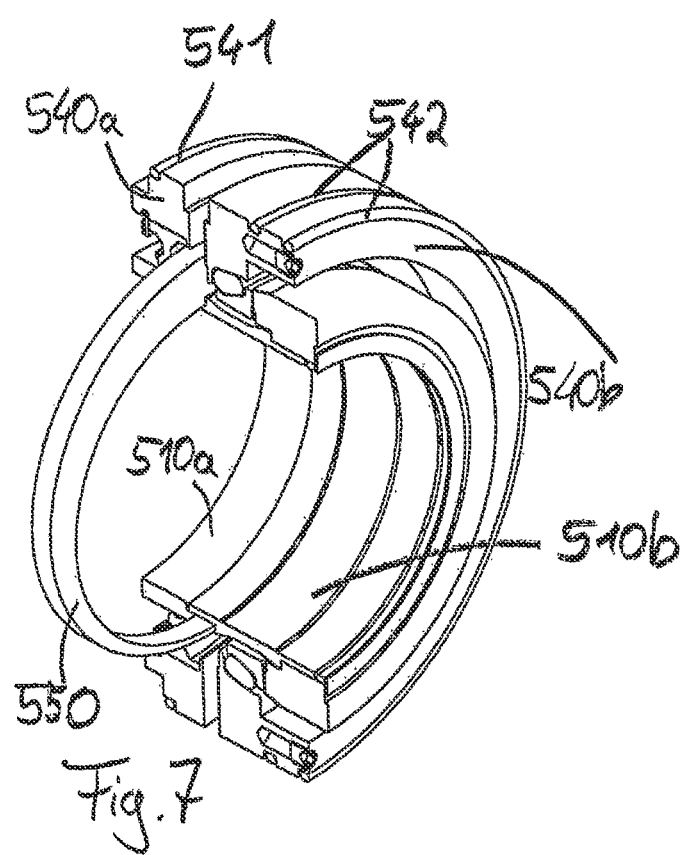

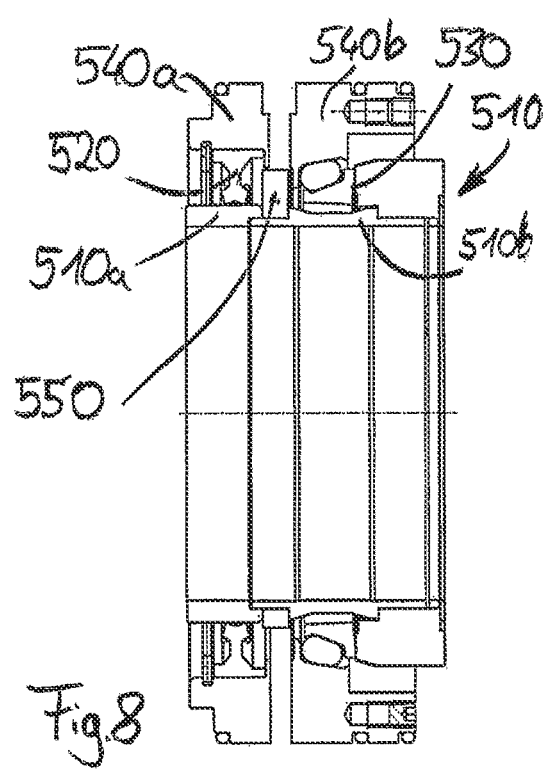

ROTARY PISTON PUMP HAVING A SEALING CHAMBER SEAL

CROSS-REFERENCE TO FOREIGN PRIORITY APPLICATION

The present application claims the benefit under 35 U.S.C. §§ 119(b), 119(e), 120, and/or 365(c) of PCT/EP2017/076956 filed Oct. 23, 2017, which claims priority to German Application No. 202016106107.5 filed Oct. 31, 2016.

FIELD OF THE INVENTION

The invention relates to a seal assembly for a rotary piston pump.

BACKGROUND OF THE INVENTION

Rotary piston pumps are pumps which operate according to the principle of displacement and which by means of two rotary pistons which are mutually engaged and rotate about parallel, spaced-apart axes cause a displacement of the pumped fluid between the rotary pistons and convey the fluid in the mutually opposite external circumferential regions of the rotary pistons. The rotary pistons are disposed in a pump housing. Said rotary pistons are rotatably mounted, typically in that the rotary pistons are fastened on shafts which are rotatably mounted at least on one side, typically on both sides, in bearings, for example, roller bearings or friction bearings. Driving the rotary pistons is performed by way of one of the two shafts or both shafts, in that said shafts are coupled to a drive means. For example, one shaft can extend from the housing and be connected to a PTO shaft, or the outwardly extending shaft can be coupled directly or indirectly to a drive motor that is dedicated to the pump. Rotary piston pumps are often additionally equipped by a synchronization gear mechanism. The latter herein are two gear wheels which are mutually engaged, are fastened on the shaft, and establish a synchronous rotating movement of the two rotary pistons.

Rotary piston pumps are often used for particle-containing liquids, for example, liquids which entrain sand particles or other solids in particulate form or in a comparatively coarse form. Considerable positive pressures can arise in the pump housing herein, depending on the pump resistance in the form of a counter pressure in the output line. In general, it is disadvantageous in terms of the service life of both the mountings of the shafts as well as the drive means and the synchronization gear mechanism, when the pumped conveyed fluid under such pressure conditions could advance from the pump housing into the regions of the mountings, the drive means, or the synchronization gear mechanism. The synchronization gear mechanism, often also the mountings, are lubricated by a special lubricating medium which guarantees a very high service life of said components. The service life would be significantly reduced on the account of an invasion of pumped conveyed fluid or of particles from said conveyed fluid in said lubricant.

It is, in principle, known to pre-empt the invasion of pump-conveyed fluid into the regions that are sensitive to contamination, such as the mounting, the synchronization gear mechanism, and the drive, by disposing a radial shaft seal ring and optionally further mechanical seal assemblies. While such seal assemblies in the operation of the pump at low differential pressures can often still effect sufficient sealing, however, an invasion of pump-conveyed liquid and particles contained therein into the mounting components, the synchronization gear mechanism, or the drive installation of the rotary piston pump arises already under such normal conditions, particularly at high differential pressures and positive pressures in the pump housing. This significantly compromises the service life of said components. It is an object of the invention to provide a rotary piston pump having an improved service life even in the case of a particularly high positive pressure in the pump housing of the rotary piston pump.

SUMMARY OF THE INVENTION

This object is achieved according to the invention by a seal assembly for a rotary piston pump configured for conveying pump-conveyed fluid, said sealing assembly comprising a sealing-fluid pump device having a pump inlet and a pump outlet; an eccentric element having an encircling eccentric circumferential face that is eccentric in relation to a rotation axis; a blocking chamber which is connected to the pump outlet and which is disposed so as to neighbor the pump chamber of the rotary piston pump, by way of the pump outlet, is impinged with a fluid pressure resulting from the fluid pressure differential that is generated by the sealing-fluid pump device, and by means of said fluid pressure seals the pump chamber in relation to the egress of pump-conveyed fluid from the pump chamber along the pump shaft.

A seal assembly which achieves reliable sealing of the region between the pump-conveyed fluid and the components responsible for mounting, synchronization, and drive is provided according to the invention. This sealing effect is achieved along the pump shaft, and is to be understood as being in sealing in relation to the fluid egress along the pump-shaft surface or along the surface of components which conjointly rotate with the pump shaft. The seal assembly according to the invention comprises a sealing-fluid pump device which can be configured in various ways. In general, the sealing-fluid pump device has a pump inlet and a pump outlet, a fluid pressure differential being generated by the functioning of the sealing-fluid pump device between said inlet and outlet. The sealing-fluid pump device can be formed, for example, by a piston which, by way of two check valves, suctions pumped fluid from the pump inlet and conveys said pumped fluid into the pump outlet while simultaneously blocking the return flow direction back into the pump inlet or out of the pump outlet. Controlled valves which are moved by a control rod and which likewise are moved by way of the eccentric element, or other embodiments, can also be implemented, instead of such check valves.

The sealing-fluid pump device generates a fluid pressure and optionally a fluid flow of a sealing liquid. Said sealing liquid is also present in a blocking chamber which is connected to the pump outlet, and on account thereof generates a fluid pressure within said blocking chamber. The blocking chamber is disposed as a sealing barrier between the pump chamber and a space that is to be sealed in relation to the pump-conveyed fluid, thus, in particular, a mounting region, a synchronization gear mechanism, or a drive element. The pressure chamber by means of sealing elements is sealed in relation to at least the pump chamber.

A consolation which achieves particularly reliable sealing of the pump chamber in relation to the egress of pump-conveyed fluid is generated on account of this design embodiment of a pressurized blocking chamber while simultaneously driving the pump unit that generates the pressure in the blocking chamber by way of the drive shaft of the rotary pistons. The blocking chamber, in turn, forms a pressure-filled space, the internal pressure thereof moreover being able to be rendered as a function of the operating state of the pump. For example, it is thus possible for the rate of the pressure build-up, the volumetric flow of the sealing fluid within the blocking chamber, or the pressure within the blocking chamber, to be controlled as a function of the rotating speed of the rotary piston pump. A high pressure differential between the blocking chamber and the pump chamber can, therefore, be avoided, even when the pump chamber conveys counter to high resistance forces. Instead, the pressure differential between the pump chamber and the blocking chamber is kept minor by way of the pressure built-up in the blocking chamber. This effects reliable sealing of the pump chamber.

It is to be understood that the blocking chamber can, in particular, also have sealing on both sides, thus sealing in relation to the pump chamber as well as sealing in relation to the component which is to be sealed in relation to the pump chamber, thus the mounting component, the synchronization gear mechanism, or a drive element, for example. On account thereof, the egress of sealing fluid from the blocking chamber to the component to be sealed is also prevented, and conversely the ingress of fluids or particles into the blocking chamber from that side is prevented. In principle, it is to be understood that the blocking chamber can also be filled with a sealing fluid which corresponds to the lubricant of the respective component, thus, for example, a transmission oil in a synchronization gear mechanism or a mounting component, such that separate sealing between the blocking chamber and said component can also be dispensed with in certain applications.

It is particularly preferable for the sealing-fluid pump device to comprise an eccentric element having an encircling eccentric circumferential face that is eccentric in relation to a rotation axis; a flange connector which is coupled to the eccentric element and which is configured for a torque-locking connection to a pump shaft of the rotary piston pump that leads out of a pump chamber of the rotary piston pump; a pump unit which is coupled to the eccentric element and which has the pump inlet and the pump outlet and upon rotation of the eccentric element is configured for generating in a sealing fluid a fluid pressure differential between the pump inlet and the pump outlet.

The sealing-fluid pump device according to this embodiment comprises an eccentric element having an encircling eccentric circumferential face that is eccentric in relation to a rotation axis. Said eccentric element can be formed, for example, by a cam element which has a cam elevation, thus a region which has a circumferential radius that is larger in relation to the other circumferential region. The eccentric element can also be embodied by rotationally-symmetrical bodies, for example, a component having two cam elements that in the circumferential direction are offset by 180, three or four such cam elements in the manner of a multi-cam element, or a cam disk. The eccentric element can just as well be formed by a disk which has a circular circumferential portion and which is fastened to the rotation axis or so as to be eccentric in relation to the center of said disk, the circumferential face of said disk on account thereof describing an eccentric path. In terms of the functioning of the eccentric element it is relevant that a cyclical movement is achieved, a face of the eccentric element upon the rotation of said eccentric element, said face being potentially formed in particular by a circumferential face but also by an axial face or an axial-radial face.

The eccentric element is coupled to a flange connector, thus is configured so as to be integral to such a flange connector, for example, or is fastened in a torque-locking manner to a separate flange. Said flange connector enables the eccentric element to be connected in a torque-locking manner to a pump shaft of the rotary piston pump so that the eccentric element on account of the rotation of the pump shaft is also set in rotation. The eccentric element can be fastened directly on the pump shaft or be coupled in a torque-locking manner to the pump shaft by way of a transmission or the like.

According to a further embodiment thereto, the pump unit comprises an eccentric pin which had a first eccentric pin end that bears on the eccentric circumferential face of the eccentric element; a pump piston having a first piston face which interacts with the second eccentric pin end, and delimits a pump space that is connected to the pump outlet; a pretensioning element which interacts with a second piston face which in the piston longitudinal axis is disposed so as to be opposite the first piston face and elastically pretensions the pump piston in a radial manner in the direction toward the eccentric circumferential face; a passage duct through the pump piston which connects the first piston face to the second piston face and which is closed by a pump piston valve which is pretensioned to a closed position; wherein the pump piston valve has a valve body having a valve body face which, upon the impingement of the first piston face with a negative pressure, causes an opening force on the valve body which is directed counter to the pretensioned that act in the closed position, and the elastic force of the pretensioning element exerts a force which acts on the pump piston and which exerts a fluid pressure on a fluid that is situated in the pump space. According to this embodiment, the pump unit is realized by a disposal of an eccentric pin and a pump piston which are embodied so as to bear on one another, wherein the eccentric pin bears on the eccentric circumferential face of the eccentric element. This mechanical chain is pretensioned by a pretensioning element in such a manner that bearing on the eccentric circumferential face is realized by the pretension. The pump piston herein has a pump piston valve which in a reciprocating stroke movement of the pump piston in an alternating manner enables sealing fluid to be suctioned into the pump space in that said pump piston valve opens on account of the negative pressure that is generated by the stroke of the pump piston and subsequently permits a build-up of pressure in the pump space, in that said pump piston valve closes when the negative pressure drops and the positive pressure increases as a result of a reciprocating pump piston movement. This embodiment enables a reliable and robust conveying effect and the correspondingly reliable build-up of pressure in the sealing fluid, on the one hand, and already by way of the effect of the pump piston valve can cause a delimitation of the pressure in that the conveying effect in the build-up of positive pressure in the pump is in this instance prevented by virtue of the now absent suctioning of sealing fluid, on the other hand.

According to one further preferred embodiment the seal assembly is refined in that the blocking chamber is configured as a throughflow blocking chamber and has at least one mechanical seal, and the mechanical seal is lubricated by a fluid stream of the sealing fluid that results from the fluid pressure. According to this embodiment, the sealing fluid flows through the blocking chamber. A throughflow herein is to be understood such that the blocking chamber can be equipped with an inflow and an outflow, on the one hand, so that the sealing fluid can be conveyed in a circuit by the sealing-fluid pump device. A throughflow herein is, however, also to be understood such that the blocking chamber has only an inflow and a minor quantity of leak which makes its way out by way of seals which seal the blocking chamber. This is advantageous, for example, in the case of mechanical seals so as to establish a reliable leakage direction by way of which it is prevented that the pump-conveyed fluid and particles contained therein make their way into the region of the mechanical seal and can damage the latter or reduce the sealing effect of the latter. It is to be understood herein that the seal assembly can be equipped with continuous topping-up of sealing fluid from the reservoir. It is furthermore to be understood that the throughflow of the blocking chamber by way of an only minor volumetric flow is sufficient for typical specific applications in order to achieve the desired effects, specifically a prevention of the ingress of particles or pump-conveyed fluid into the blocking chamber and a continuous throughput of the sealing fluid through the blocking chamber. In principle, the volumetric flow through the blocking chamber can be embodied so as to be controlled in terms of pressure controlled in terms of volume; the sealing-fluid pump device can be configured in a corresponding manner so as to convey a predetermined volume per unit of time, or to maintain a predetermined pressure.

According to one further preferred embodiment it is provided that the blocking chamber is configured as a closed blocking chamber, and a predetermined fluid pressure in the blocking chamber is maintained by means of the fluid pressure differential that is generated by the sealing-fluid pump device. In the case of this embodiment, no throughflow of the blocking chamber is provided, but the sealing-fluid pump device maintains a constant pressure in the blocking chamber without herein conveying circulating the sealing fluid as a volumetric flow. This embodiment is particularly suitable for applications in which a passage of leakage through seals from the blocking chamber is not desired in order to avoid any contamination of the environment or the pump-conveyed fluid. It is likewise advantageous in the case of this embodiment, that topping-up of sealing fluid is not required, but the operation of the seal assembly can be carried out using a permanent filling of sealing fluid.

According to one further preferred embodiment it is provided that the sealing-fluid pump device has a setting device for delimiting the fluid pressure that is generated in the blocking chamber. Such a device for delimiting the fluid pressure can be embodied by way of a pressure relief valve, preferably an adjustable pressure relief valve, which allows the sealing fluid to pass in a bypass duct. In other embodiments it is advantageous for the setting device to interact with the sealing-fluid pump device in such a manner that the pumping effect of the sealing-fluid pump device is reduced or set to zero when a specific fluid pressure in the sealing fluid is achieved or exceeded, for example in that the stroke of a pump piston is influenced or regulated as a function of the fluid pressure in the sealing fluid. It is achieved on account of this refinement that a predetermined pressure, in particular, pressure that is capable of being set, in the sealing fluid prevails during the operation so that the effect of the seal can be adapted in an optimal manner to a specific rotary piston pump or a specific operating state on the rotary piston pump.

It is yet furthermore preferable for the sealing-fluid pump device, when exceeding a predetermined fluid pressure in the blocking chamber, to be configured for releasing the passage of fluid from the pump outlet to the pump inlet and in this manner for opening a return flow of fluid from the blocking chamber through the sealing-fluid pump device while bypassing the sealing-fluid pump device. Reliable controlling of the pressure of the sealing fluid is achieved by way of this embodiment, in that when reaching or exceeding, respectively, a specified pressure, a return flow from the outlet to the inlet of the sealing-fluid pump device is released, this leading to a pressure drop or a pressure delimitation, respectively. This embodiment can be implemented, for example, by a check valve which is integrated in the sealing-fluid pump device and which is inserted in a corresponding line which connects the outlet to the inlet, said check valve opening at a specific pressure and on account thereof releasing said line.

It is yet furthermore preferable for the pump inlet to be connected to a fluid reservoir. A reserve quantity of sealing fluid can be kept available by providing such a fluid reservoir, and any potential losses of sealing fluid by leakages can be preempted on account thereof. It is to be understood herein that the pump inlet can be connected to the fluid reservoir, on the one hand, but also to an inflow from the blocking chamber, on the other hand, particularly when a corresponding circuit of sealing fluid is provided. The reservoir herein can be disposed such that said reservoir is disposed upstream of an opening location of the return from the blocking chamber; the return from the blocking chamber can likewise open into the reservoir so that the reservoir is continuously passed by a flow when a cycle through the sealing-fluid pump device and the blocking chamber is performed.

According to one further refinement to this end it is provided that the fluid reservoir is connected to the blocking chamber by way of a pressure control valve. According to this embodiment, the sealing-fluid pump device conveys the fluid through the blocking chamber and by way of a pressure control valve into the fluid reservoir, or into a line that is connected to the fluid reservoir, respectively, said line potentially extending from the fluid reservoir to the pump inlet. A predetermined fluid pressure, in particular, a fluid pressure that is capable of being set by adjusting the pressure control valve, can be maintained in the blocking chamber when the sealing-fluid pump device conveys the sealing fluid, or builds up a pressure in the sealing fluid, respectively, by providing such a pressure control valve which opens only at a specific pressure prevalent thereon. The triggering threshold of the pressure control valve herein is typically lower than the triggering threshold of a pressure regulator valve that is integrated in the pump unit.

It is to be understood, in principle, that the operating state of the sealing-fluid pump device, by virtue of the activation of the sealing-fluid pump device by the rotation of the pump shaft of the rotary piston pump, is adapted to the operating state of the rotary piston pump and, on account thereof, the conveying rate, or the pressure generated in the blocking chamber, which is generated by the sealing-fluid pump device, respectively, is also a function of the conveying rate, or the pressure prevailing in the pump chamber, respectively, either being generated by the rotary piston pump. However, independently thereof, it is advantageous for a setting potential in terms of the blocking chamber pressure and/or of the conveyed volume of the sealing-fluid pump device to be provided on account of the preferred embodiment. This setting potential can influence, for example, the pressure differential which is generated by the sealing-fluid pump device; a maximum pressure, or a maximum pressure differential, respectively, can likewise be determined by the setting. Furthermore, a proportionality factor between the pressure generated in the blocking chamber by the sealing-fluid pump device and the pressure generated in the pump chamber by the rotary piston pump, or between the conveyed volume generated by the sealing-fluid pump device and the conveyed volume generated by the rotary piston pump, can be defined by way of the setting capability. It is, in particular, preferable for the pressure in the blocking chamber to be set such that said pressure does not drop below half of the sum calculated from the output pressure and the input pressure of the pump chamber in any operating state of the rotary piston pump. It is guaranteed on account thereof that the blocking chamber pressure at all times lies above the averaged pressure in the pump chamber. For an operation that is particularly safe in terms of leakage it is advantageous for the pressure in the blocking chamber to be set higher than the pressure at the inlet or at the outlet of the pump chamber, depending on which of these two pressures is higher.

According to one further preferred embodiment it is provided that the seal assembly is refined by way of a second blocking chamber which at another, spaced-apart, location seals the pump chamber in relation to the egress of pump-conveyed fluid, wherein the pump inlet of the sealing-fluid pump device is connected to a fluid reservoir; the blocking chamber is connected to the second blocking chamber; and the blocking chamber, or the second blocking chamber, is connected to the reservoir by way of a check valve. According to this embodiment, sealing of a rotary piston pump by means of two blocking chambers is realized by way of a single seal assembly. The two blocking chambers herein can seal the rotary piston pump at two opposite ends of a pump shaft, thus on both sides of a pump chamber of the rotary piston pump. This arrangement is advantageous, for example, when reliable sealing is also to be achieved on both sides of the pump chamber, thus at both locations where the pump chamber housing is penetrated by the pump shaft, so as to protect components disposed there against the ingress of pump-conveyed fluid and, in particular, particles contained therein. The blocking chamber herein is connected to the second blocking chamber, which is to be understood as a fluidic connection between the blocking chamber and the second blocking chamber. This fluidic connection can be embodied in such a manner that the blocking chamber and the second blocking chamber are connected to one another in series such that fluid which is to reach the second blocking chamber has first passed through the blocking chamber. Alternatively, the connection can also be embodied as a parallel connection between the blocking chamber and the second blocking chamber; in the case of such a parallel connection the blocking chamber as well as the second blocking chamber are connected directly to the sealing-fluid pump device such that fluid from the sealing-fluid pump device can be conveyed directly to the blocking chamber and also directly to the second blocking chamber. It is furthermore to be understood that the optionally provided return flow from the blocking chamber and the second blocking chamber to the sealing-fluid pump device, or to a reservoir that is connected to said sealing-fluid pump device, can be performed in an arrangement in series or in parallel.

According to one further preferred embodiment the sealing assembly according to the invention is refined by a control unit for controlling the pressure in the blocking chamber. In principle, as previously mentioned, the pressure in the blocking chamber can be controlled so as to be a function of the rotating speed of the pump shaft of the rotary piston, on the one hand, and in particular increase along with an increasing rotating speed, so as to, on account thereof, also have a correspondingly increased counterpressure in the blocking chamber, or the blocking chambers, respectively, acting counter to an increased pressure in the pump chamber of the rotary piston pump and to maintain the sealing effect. The control unit in this case can be realized or integrated, respectively, in the sealing-fluid pump device in that a rotating-speed-dependent conveying rate and a corresponding rotating-speed-dependent pressure build-up is performed in said sealing-fluid pump device. The control unit can also be implemented by way of control elements or installations that are independent therefrom, or by additional control elements or installations. Controlling can also be carried out by means of a control unit in the form of a pressure relief valve, which, for example, makes the pressure in the blocking chamber capable of being set. The control unit can, in particular, also be embodied in such a manner that said control unit detects a pressure in the pump chamber of the rotary piston pump and sets the pressure in the blocking chamber as a function of said pressure in the pump chamber.

The embodiment can be further refined in that the control unit is configured for initiating a pressure in the blocking chamber, or the blocking chambers, respectively, which is higher than a pressure prevailing in the pump chamber. For example, the currently prevailing pressure in the pump chamber, that is to say, the respective current pressure which is configured within the pump chamber during the often pulsating pressure profile is to be understood herein as a pressure prevailing in the pump chamber. However, a mean pressure which results when averaged over time, for example, can likewise be understood to be a pressure prevailing in the pump chamber. The pressure in the pump chamber of the rotary piston pump in turn can be understood to be half the sum calculated from the pressure in the pump chamber outlet opening and the pump chamber inlet opening, wherein the ratio of said two pressures, by virtue of the operating principle of the rotary piston pump as a volume-conveying pump, can be very different, depending on the operating state and external conditions. By setting a pressure in the blocking chamber which is higher than such a pressure prevailing in the pump chamber, any undesirable leakage of liquids from the pump chamber into the blocking chamber and through the blocking chamber can thus be reliably prevented. A pressure prevailing in the pump chamber herein can, in particular, also be understood to be a maximum pressure in the pump chamber, thus a peak pressure which optionally arises only briefly but in this instance could cause a corresponding leakage.

The refinement by way of a control unit for controlling the pressure in the blocking chamber can yet furthermore be refined in that the control unit is configured for increasing the pressure in the blocking chamber, in particular, by way of a pressure prevailing in the pump chamber, for a predetermined temporal period at predetermined temporal intervals or in predetermined operational states. It is achieved by increasing the pressure in this form that sealing fluid flows from the blocking chamber in the direction of the pump chamber of the rotary piston pump and, on account thereof, cleans the shaft seals from any fluid that has potentially ingressed from the pump chamber and conveys such fluid back to the pump chamber, even when said fluid has already ingressed into the blocking chamber. This pressure increase can be performed at regular temporal intervals and often has to be carried out only for the duration of a few seconds in order for the desired effect to be achieved. The increase of the pressure can also be regularly carried out in the switching-on procedure of the pump or the switching-off procedure of the pump, for example, or be made a function of other events in terms of control technology. The regular increase of pressure is particularly preferable when very variable pressure conditions prevail in the pump chamber, for example, on account of correspondingly variable external pressure conditions at the pump inlet opening or the pump outlet opening, and when reliable controlling and adapting of the pressure in the blocking chamber to said variable pressure conditions in the pump chamber is not possible in a reliable manner. In this case, it can be accepted that minor quantities of conveyed fluid advance in the direction of the blocking chamber; said minor quantities are then urged back on account of the regular increase of pressure in the blocking chamber.

According to one further refinement, a leakage sensor for detecting a leakage from the blocking chamber, or the blocking chambers, respectively, is provided, and in that the control unit in terms of signaling technology is coupled to the leakage sensor and, as a function of the sensor signal of the leakage sensor, is configured for initiating the pressure in the blocking chamber, or the blocking chambers, respectively, in particular by increasing the pressure in the blocking chamber/the blocking chambers in the event of a leakage below a predetermined lower leakage limit value, and/or reducing the pressure in the blocking chamber/blocking chambers in the event of a leakage above a predetermined upper leakage limit value. In principle, a permanent minor leakage from the blocking chamber is an indication that the desired sealing effect of the blocking chamber is achieved and is maintained. According to the embodiment it is, therefore, provided that said leakage is monitored, to which end a leakage sensor which can be embodied as a separate construction element, or so as to be integrated in the sealing-liquid pump device, and which detects said leakage and consequently permits controlling in the manner that the pressure in the blocking chamber is initiated as a function of said leakage, is provided. In principle, this is performed in the manner that the pressure is reduced in the case of an increasing leakage, and the pressure is increased in the case of a decreasing leakage; the pressure herein can above all be adjusted in such a manner that the leakage lies in a predetermined interval, thus above a lower limit and below an upper limit. The control unit herein can likewise be integrated in the sealing-liquid pump device, for example in that said control unit is embodied such that forcible volumetric conveying is performed into the blocking chamber, this forcing a respective volumetric outflow in the form of a leakage from the blocking chamber.

According to one further preferred embodiment it is provided that the first shaft seal is a mechanical seal, in particular, a mechanical seal which is configured for building up a hydrodynamically formed lubricating film. A mechanical seal is very suitable particularly at this sealing location in order to achieve reliable sealing even when an occasional or temporary ingress of solids or particles into the sealing region can arise, since such solids and particles can be flushed or repelled, respectively, out of the mechanical seal again, wherein such a particle in the case of a radial shaft seal, having the dedicated seal lip as a matter of construction principle, can lead to damage to the seal edge and thus to irreversible loss of tightness of the seal. The mechanical seal herein can, in particular, build up a hydrodynamically formed lubricating film, thus a pressure build-up within the mechanical seal that is generated on account of the relative movement between the pump shaft and a sealing surface, said hydrodynamically formed lubricating film leading to a reliable separation between the pump shaft, or a rotating component that is connected to the pump shaft, and a stationary sealing surface, the hydrodynamically built-up lubricating film being situated therebetween.

According to one further preferred embodiment, the seal assembly is refined by a second shaft seal which encloses the pump shaft and seals the blocking chamber on a side that is opposite the first shaft seal. Like the first shaft seal, this second shaft seal encloses the pump shaft and consequently lies so as to be coaxial with the first shaft seal. The blocking chamber is disposed between the first shaft seal and the second shaft seal such that, for example, sealing a pump chamber of the rotary piston pump in relation to a gear mechanism space of the rotary piston pump can be achieved by way of the blocking chamber in that the first seal assembly seals the blocking chamber in relation to the pump chamber, and the second seal assembly seals the blocking chamber in relation to the gear mechanism space. The pump shaft herein penetrates the blocking chamber and consequently also the two shaft seals.

The second shaft seal herein can preferably be a radial shaft seal ring, thus a seal element which by way of a seal lip which is tensioned by an encircling helical spring and which lies in a sealing manner on the pump shaft or on a shell that rotates conjointly with the pump shaft, or the like, wherein the radial shaft seal ring has a substantially U-shaped cross section, the seal lip being disposed on one leg end of said U-shaped cross section, and the legs of said U-shaped cross section pointing in the direction of that space of the two spaces to be sealed in relation to one another that has a higher pressure, so as to on account thereof achieve that the seal lip by contact pressure lies on the rotating component when said pressure is increased.

A further aspect of the invention relates to a rotary piston pump, comprising a pump chamber having a pump chamber inlet opening and a pump chamber outlet opening; two mutually meshing rotary pistons which are fastened on two pump shafts that correspondingly run so as to be mutually parallel and which, in a mutually opposing rotation, convey a pump-conveyed fluid from the pump chamber inlet opening to the pump chamber outlet opening; a drive mechanism which for driving the rotary pistons is coupled to at least one of the two pump shafts; said rotary piston pump having a seal assembly having a blocking chamber of the type mentioned above, wherein the blocking chamber is disposed for sealing the pump chamber.

By way of this design embodiment of a rotary piston pump, the advantageously sealing of the seal assembly described above is utilized in a manner according to the invention for preventing the egress of pump-conveyed fluid or particles from the pump chamber, for example, into a drive mechanism, or a mounting, or a synchronous gear mechanism, of the rotary piston pump.

It is particularly preferable herein for the drive mechanism to have a synchronization gear mechanism which for synchronizing the rotation of the two pump shafts is disposed in a gear mechanism space, and the seal assembly seals the gear mechanism space in relation to the pump chamber. An advantageous construction of the rotary piston pump having a synchronization gear mechanism that is disposed so as to neighbor the pump space is implemented by way of said embodiment of the rotary piston pump according to the invention, and reliable sealing between the pump chamber and the synchronization gear mechanism is implemented.

It is furthermore preferable for the blocking chamber to seal in relation to the passage of pump-conveyed fluid along the two pump shafts. According to this embodiment, sealing along both pump shafts of the rotary piston pump is realized by way of the blocking chamber; that is to say that the passage of pump-conveyed fluid to the drive mechanism along the one shaft as well as along the second shaft is prevented by way of the blocking chamber. The blocking chamber herein is configured as a blocking chamber that encloses both passage locations of the two pump shafts, wherein this is to be understood such that said blocking chamber can also be formed by two blocking chamber portions which are connected to one another.

It is finally yet further preferable for the rotary piston pump according to the invention to be equipped with a second blocking chamber as has been described above in the context of the seal assembly, and for it to be provided herein that the second blocking chamber, opposite the blocking chamber, seals in relation to the passage of pump-conveyed fluid along the two pump shafts. Reliable sealing of the pump chamber along the pump shafts on both sides of the pump chamber is achieved by the blocking chamber and the second blocking chamber on account of said embodiment. It is again to be understood that the second blocking chamber herein can also be formed by two blocking chamber portions which are fluidically connected to one another so as to achieve the sealing of both passage locations of the pump shaft on account thereof.

It is furthermore preferable for the second blocking chamber to be disposed between the pump chamber of the rotary piston pump and a mounting unit for the pump shafts of the rotary piston pump, and to seal said mounting unit in relation to the pump chamber, wherein a sealing lubrication fluid which is conveyed by the sealing-fluid pump device is disposed in the blocking chamber, and that the pump outlet of the sealing-fluid pump device for conveying sealing lubrication fluid to the mounting unit is fluidically connected to the mounting unit. The first blocking chamber and the second blocking chamber are disposed on both sides of the pump chamber of the rotary piston pump such that said pump chamber lies between the two blocking chambers and consequently also between a mounting of the pump shafts on the one side, beyond the first blocking chamber, and on the other side, beyond the second blocking chamber. While a mounting of the pump shafts beyond the second blocking chamber can, in principle, be provided with a service-life filling of a lubricating medium in many types of applications, it is, however, advantageous for other applications for a circuit of a lubricating medium to be provided, or for a lubricating medium to be supplied to said mountings by way of a corresponding conveying installation. To this end, the sealing-fluid pump device can be used in particular according to this embodiment, said sealing-fluid pump device in this case conveying a sealing fluid which is also suitable as a lubricating medium, thus a sealing/lubricating fluid, and being able to convey the latter from the first blocking chamber into the second blocking chamber and from them to a storage unit, or by way of a bypass line being able to impinge directly said storage unit with the sealing/lubricating fluid.

A further aspect of the invention relates to a sealed cartridge which is configured for a seal assembly, or a rotary piston pump, respectively, of the type mentioned above, and which comprises a first shaft seal having an internal circumferential face which surrounds a passage opening for a pump shaft and is configured for the sealed disposal in the manner of a relative movement about the pump shaft, and a second shaft seal having an internal circumferential face which surrounds a passage opening for the pump shaft and is configured for the sealed disposal in the manner of a relative movement about the pump shaft; and an activation element which is disposed between the first and the second shaft seal, is capable of being coupled in a torque-locking manner to the pump shaft, and has an activation face for a sealing-fluid pump device. It is desirable, in particular, in the case of rotary piston pumps which are used for conveying abrasive and aggressive media for the sealing elements of the rotary piston pump to be able to be replaced in the course of regular maintenance procedures and for said maintenance procedure to be able to be carried out in a rapid manner. For this purpose it is provided according to the invention that the components relevant to such an exchange, thus the components that are particularly exposed to wear, are combined in a sealed cartridge which can be replaced as one related integrated construction element and be installed in the rotary piston pump so as to in this way establish the seal assembly according to the invention. The seal cartridge herein comprises a first seal assembly and the second seal assembly which serve for a sealing the pump shafts or rotating construction elements, such as a sleeve or the like, that are connected the pump elements. The seal cartridge furthermore comprises an activation element which is disposed between said two shaft seals and is configured so as to be connected to a pump shaft rotation in a fixed manner. Said activation element can be embodied, for example, as a cam, an eccentric, a cam disk, a multiple cam, or the like, so as to conjointly rotate in the rotation of the pump shaft and to drive a sealing-fluid pump device which in terms of the angle is stationary in relation to said rotation. According to one preferred embodiment said sealing-fluid pump device which is configured as explained above, for example, can likewise be a component part of the seal cartridge, thus also be replaced when the seal cartridge of rotary piston pump is replaced in the course of maintenance. It is to be understood in principle that the seal cartridge preferably represents an inherently closed construction component which, for example, by way of a corresponding circumferential face or axial end face can be fastened and sealed within the rotary piston pump. Said seal cartridge in this instance effects the sealing between the pump chamber and a space of the rotary piston pump that has to be sealed in relation to said pump chamber, for example a gear mechanism space or amounting region. In principle, the use of two such seal cartridges is required when the pump chamber of the rotary piston pump is to be sealed on two axially opposite sides, for example, so as to provide two corresponding locking chamber seal assemblies.

The seal cartridge can be refined in that the first seal assembly is configured as a mechanical seal, and/or in that the second seal assembly is configured as a radial shaft seal ring. According to this embodiment, the first shaft seal and the second shaft seal are correspondingly embodied as a mechanical seal and as a radial shaft seal ring, which in terms of the particular functional mode and resilience of said two seal types explained above to this end for the application case in the unwinding region in relation to the pump chamber of the rotary piston pump, on the one hand, and in relation to a mounting region or a gear mechanism space of the rotary piston pump, on the other hand, best corresponds to an efficient and durable seal.

BRIEF DESCRIPTION OF THE DRAWINGS

A preferred embodiment of the invention will be described by means of the appended figures in which

FIG. 7 shows a perspective, partially sectional, view of a seal cartridge according to the invention; and FIG. 8 shows a sectional longitudinal view of the seal cartridge according to FIG. 7.

DETAILED DESCRIPTION OF THE EMBODIMENTS

Figure 1:
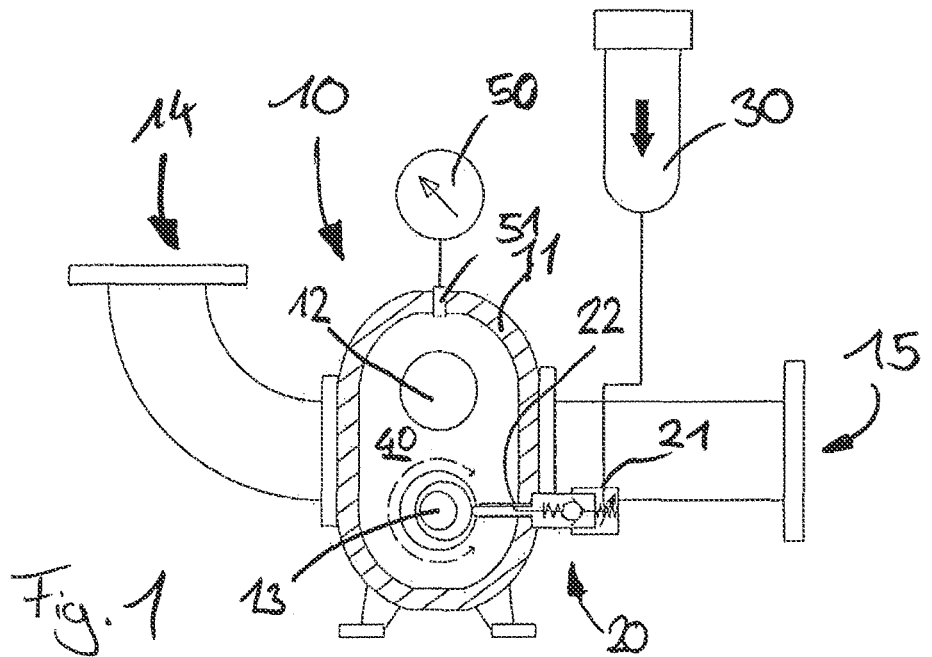
FIG. 1 shows a schematic illustration of a first embodiment of the invention.

With initial reference to FIG. 1, in the case of a first embodiment of the invention, a rotary piston pump 10 having a pump housing 11 is illustrated, two pump shafts 12, 13 being situated in said pump housing 11. Mutually meshing rotary pistons are disposed on the pump shafts 12, 13, said rotary pistons not lying on the sectional plane illustrated in FIG. 1. The pump housing has an inlet 14 and an outlet 15 wherein it is to be understood that the inlet 14 and the outlet 15 can also be swapped by reversing the rotating direction of the pump shafts.

The lower pump shaft 13 drives a pump device 20, which will be explained in more detail hereunder. The pump device 20 has a pump inlet 21 which is connected to a sealing-fluid reservoir 30.

The pump device 20 is fed from the sealing-fluid reservoir 30 and, by way of a pump outlet 22, conveys the sealing fluid into a blocking chamber 40. The blocking chamber 40 extends across the entire cross section within the pump housing 11 and is on both sides sealed in relation to other cross-sectional portions by means of seals. A synchronization gear mechanism or a mounting can thus typically be disposed in a cross section that lies in front of the image plane, and the pump interior space having the rotary pistons can be disposed in a cross section that lies behind the image plane, such that the blocking chamber 40 illustrated in the cross-sectional view as per FIG. 1 separates said pump chamber from the synchronization gear mechanism and seals said pump chamber in relation to said synchronization gear mechanism. A pressure measurement unit 50 which enables monitoring of the functioning of the blocking chamber 40 in that the pressure prevailing in the latter is indicated is connected by way of a connector 51 that reaches through a passage in the housing at the end of the pump housing 11 on the upper side. Said connector 51 simultaneously serves for venting the blocking chamber 40 so as to ensure complete filling with sealing fluid when commissioning or after maintenance procedures.

The embodiment according to FIG. 1 is distinguished by a pressurized closed blocking chamber 40. This is to be understood that the blocking chamber 40 by the pump device 20 is impinged with a sealing fluid at a positive pressure, herein however is not passed through by said sealing fluid by way of a circulation that takes place in a circuit. In principle, this can be designed such that there is no fluid flow of the sealing fluid but that a pressure is maintained only by the pump device 20, or that there is a minor flow of sealing fluid which equalizes losses on account of leakages of sealing fluid by way of the seals of the blocking chamber in the region of the pump shafts, for example measured by leakage sensor 190, and in this way maintains the fluid volume and the positive pressure in the blocking chamber 40.

Figure 2:
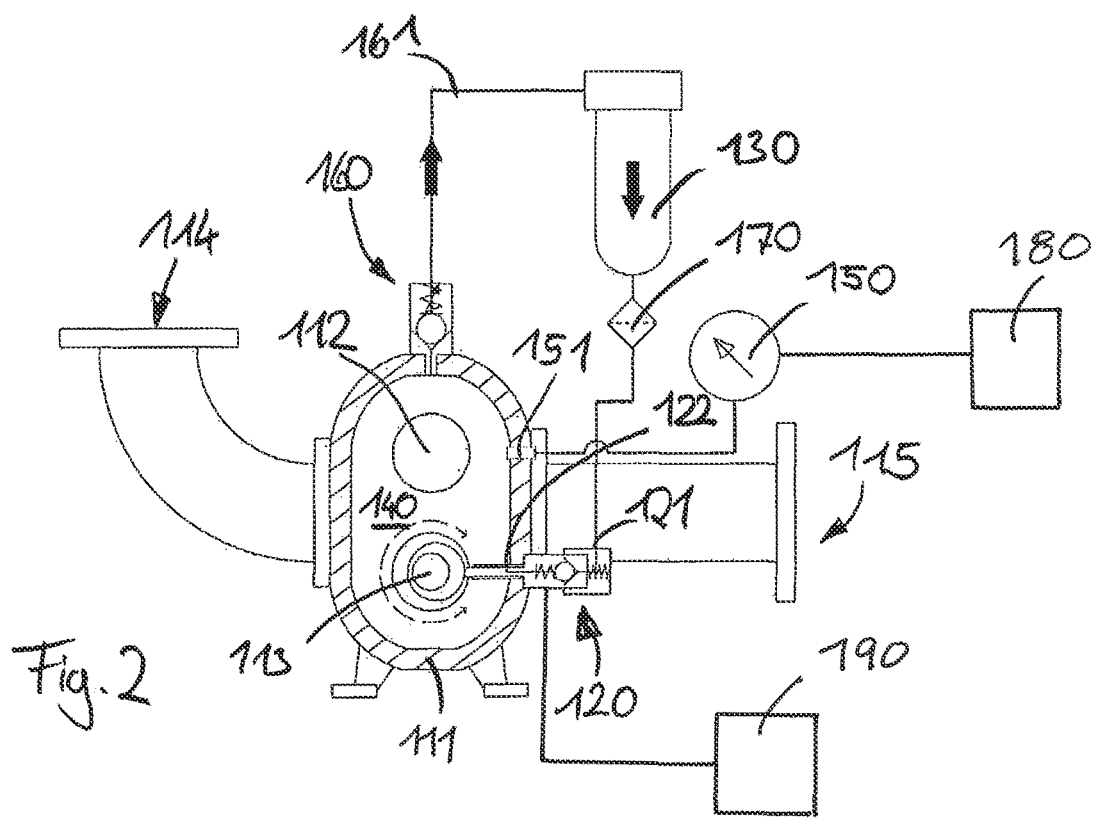
FIG. 2 shows a schematic illustration of a second embodiment of the invention.

FIG. 2 shows a second embodiment of the invention. The second embodiment in terms of the construction of the rotary piston pump having the inlet 114, the outlet 115, and the pump housing 111, as well as two pump shafts 112, 113 disposed therein, is constructed so as to be identical to the first embodiment. In a manner likewise identical to the first embodiment, a sealing-fluid pump device 120 is coupled to the lower pump shaft 113 and as a function of the rotation of said pump shaft 113 generates a pressure flow and a volumetric flow of a sealing fluid. The sealing fluid by way of a pump inlet 121 is again supplied from a sealing-fluid reservoir 130 to the pump device 120 and is conveyed at a positive pressure by way of a pump outlet 122 into a blocking chamber 140.

By contrast to the first embodiment according to FIG. 1, a check valve 160 which by means of the passage is connected to the blocking chamber 140 is disposed on the upper end of the pump housing 111 in the case of the second embodiment according to FIG. 2. The spring-loaded check valve 160 at a spring pressure that is capable of being set is closed up to a specific and positive pressure that is, thus, also capable of being set in the blocking chamber 140; when said positive pressure in the blocking chamber 140 is exceeded, the check valve 160 is however pushed to the open position and on account thereof allows sealing fluid to escape from the blocking chamber 140. The escaping sealing fluid by way of a return line 161 is supplied into the sealing-fluid reservoir 130, wherein it is to be understood that both the sealing-fluid reservoir 130 as well as the sealing fluid in the return line 161 on account of the throttling in the check valve 160 is practically at ambient pressure.

The setting of the check valve 160, thus the setting of the pressure triggering threshold of the latter, is performed by adjusting the spring pretension. A pressure measurement unit 150 by way of the passage bore 151 in the pump housing 111 is also here connected to the blocking chamber 140 for a precise setting and monitoring of the functioning of the blocking chamber 140 by a control unit 180. An oil filter 170 is inserted between the sealing-fluid reservoir 130 and the pump inlet 121.

Figure 3:
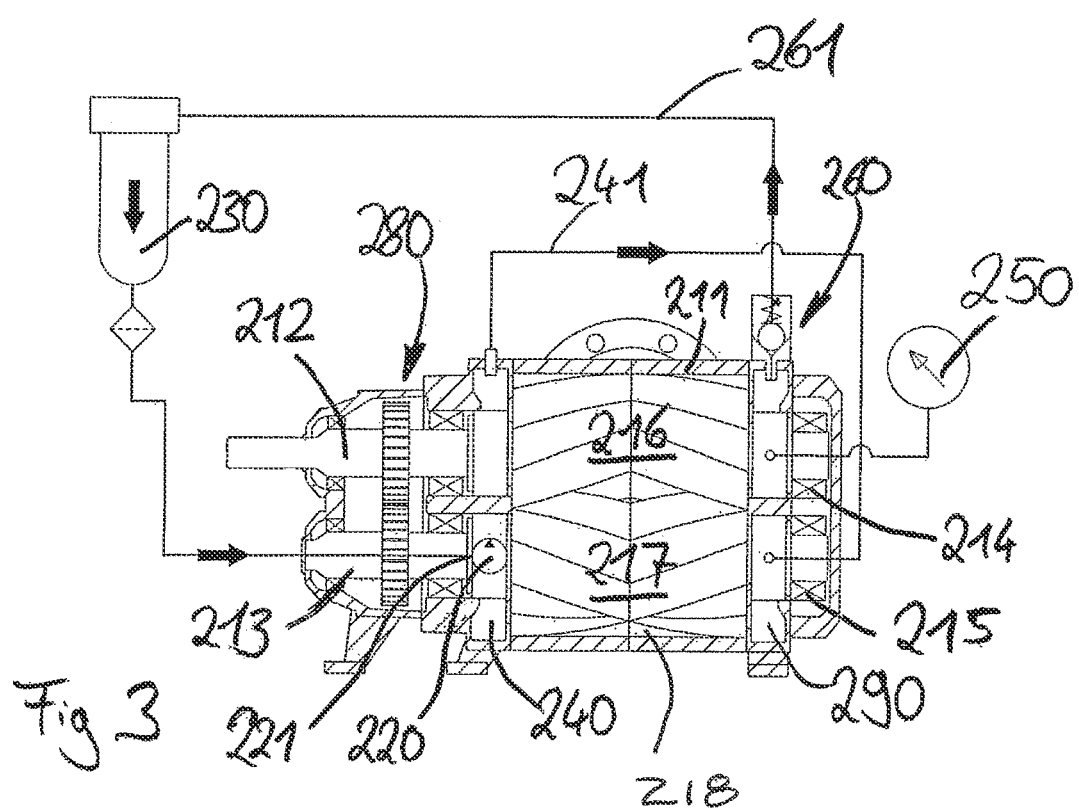
FIG. 3 shows a schematic illustration of a third embodiment of the invention.

FIG. 3 shows a longitudinal section through a third embodiment of the invention. As is the case in the preceding embodiments, a rotary piston pump is again constructed from a pump housing 211 in which rotary pistons 216, 217 are disposed on pump shafts 212, 213. A synchronization gear mechanism 280 by means of two gear wheels ensures synchronous running of the two pump shafts 212, 213. A first blocking chamber seal 240 is disposed between the synchronization gear mechanism 280 and the pump chamber 218 in the pump housing 211 and having the rotary pistons disposed in the latter. The pump shafts 212, 213 at an end that is opposite the synchronization gear mechanism 280 are mounted in roller bearings 214, 215. The second blocking chamber 290 is disposed between the pump chamber 218 in which the rotary pistons 216, 217 are disposed and the roller bearings 214, 215, and seals on account thereof sealing in relation to a passage of fluid from the pump chamber 218 to the roller bearings 214 and 215.

The third embodiment in a manner identical to the first and the second embodiments has a pump device 220 which interacts with the lower pump shaft 213. The pump device 220 by way of a pump inlet 221 is fed from a pump reservoir 230 and builds up a positive pressure in the first blocking chamber 240. The first blocking chamber 240 by means of a blocking-chamber connection line 241 is connected to the second blocking chamber 290. This connection is practically throttle-free such that the positive pressure of the sealing fluid in the first blocking chamber 240 and the positive pressure of the sealing fluid in the second blocking chamber 290 are identical. The second blocking chamber 290 by means of a check valve 260 is connected to a return line 261. On account thereof, both the first blocking chamber 240 as well as the second blocking chamber 290 can be passed by a flow of sealing fluid that is conveyed from the pump outlet of the pump device in series, wherein the check valve 260 causes a pressure delimitation and a discharge of sealing fluid into the sealing-fluid reservoir 230 by way of the return line 261. A pressure measuring unit 250 is coupled to the second blocking chamber 290 and enables setting of the positive pressure in the two blocking chambers 240, 290, as well as a functional check.

Figure 4:
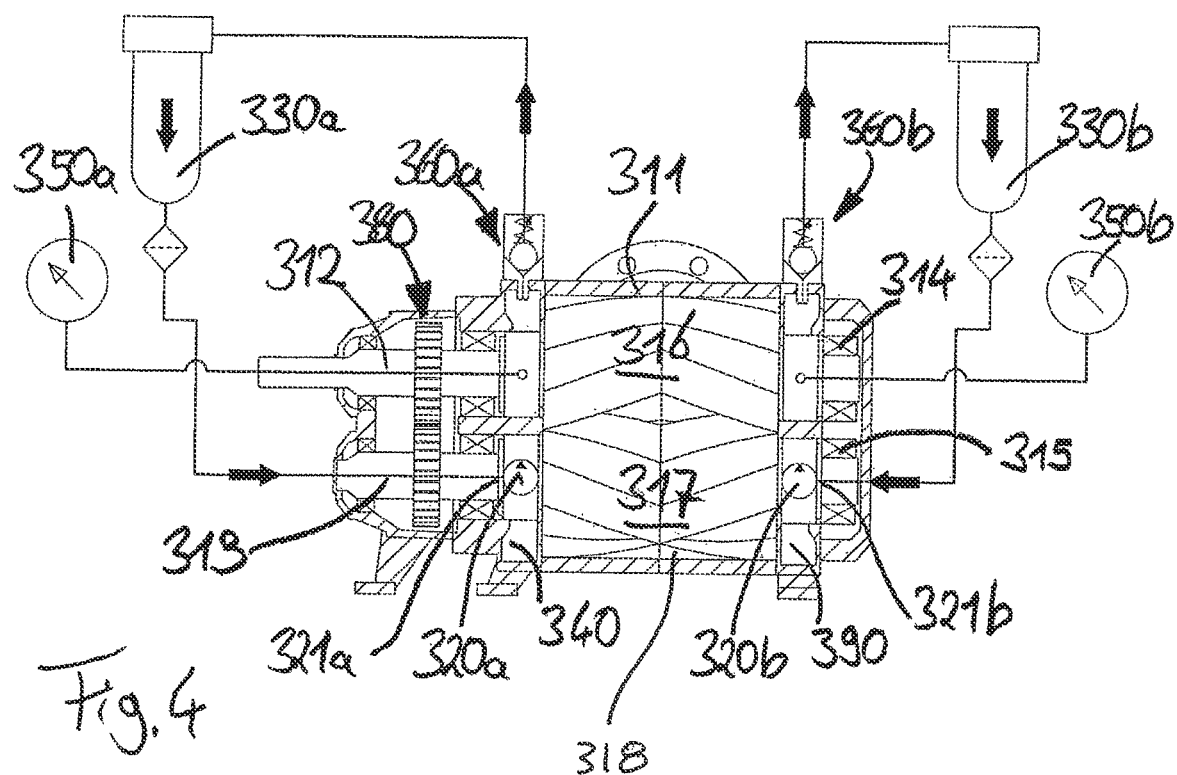
FIG. 4 shows a schematic illustration of a fourth embodiment of the invention.

FIG. 4 shows a fourth embodiment of the invention. Two blocking chambers 340, 390 are again disposed on a rotary piston pump having a pump housing 311, said two blocking chambers 340, 390 sealing a pump chamber 318 that is filled by rotary pistons 316, 317 in relation to a synchronization gear mechanism 380 and a mounting assembly along pump shafts 312 and 313.

While both blocking chambers 240, 290 in the case of the third embodiment are impinged with pressure from a single pump device 220 and are correspondingly disposed in series, this is differently implemented in the case of the fourth embodiment. The fourth embodiment has a first pump device 320a which interacts with the lower pump shaft 313 and impinges the first blocking chamber 340 with pressure. The first blocking chamber 340 by way of a check valve 360a is connected to a first sealing-fluid reservoir 330a and from the latter, by way of the pump inlet 321a of the first pump device 320a, is impinged with pressure. A first pressure measuring unit 350a is connected to the first blocking chamber 340 and enables a pressure setting and functional checking of the first blocking chamber 340.

The second blocking chamber 390 again seals two roller bearings 314, 315 in relation to the pump chamber 318 and by way of a second pump device 320b is impinged with pressure, said pump device 320b likewise interacting with the lower pump shaft 313. The first and the second pump device 320a, 320b are mutually spaced apart and independent and functionally independent. Said first and said second pump device 320a, 320b are in each case disposed in such a manner that the blocking chamber 340, or 390, respectively, that is pressurized by the pump outlet of the respective pump device is directly fed. A second check valve 360b discharges excess sealing fluid from the second blocking chamber 390 into a second sealing-fluid reservoir 330b, the second pump device 320b by way of the respective pump inlet 321b of the latter being fed from said second sealing-fluid reservoir 330b. The second blocking chamber 390 is also coupled to a separate pressure measuring unit 350b which enables setting and checking of the pressure in the blocking chamber 390.

The fourth embodiment, therefore, has two mutually independent blocking chambers which enable independent and thus dissimilar pressure setting in the first and the second blocking chamber, on the one hand, this being advantageous in specific application cases.

The functioning of the pump device will be explained in detail by means of FIGS. 5 and 6a-c.

Figure 5:
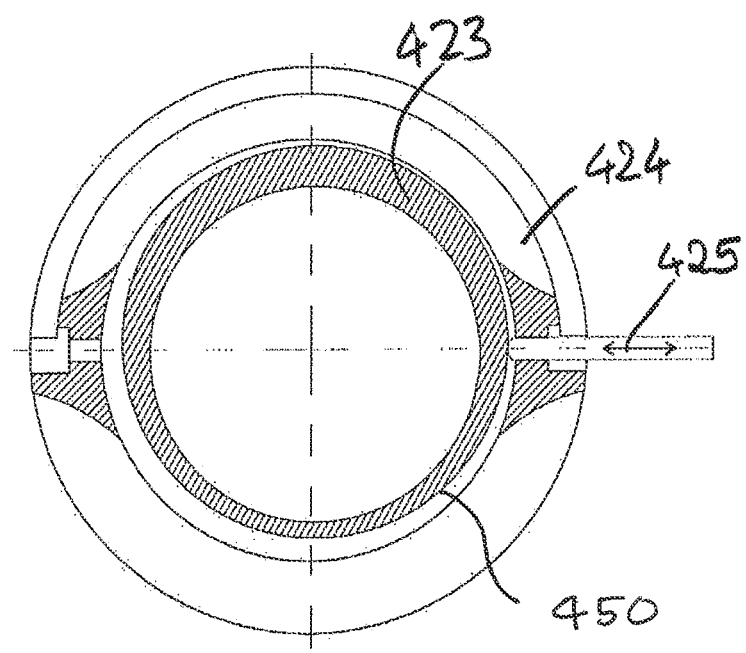
FIG. 5 shows a cross-sectional view of an eccentric element having a drive pin for a pump unit according to the invention.

FIG. 5 shows a cross section through an eccentric element 423 which can be coupled in a torque-locking manner to a pump shaft which protrudes through the interior space of the eccentric element 423. The eccentric element 423 is surrounded by a housing 424 in which a radial bore enables a pump pin 425 to be guided. The pump pin 425 bears on the external circumferential face 450 of the eccentric element 423 and by way of the eccentric element 423 is moved in a cyclical reciprocating manner in the radial direction.

The pump pin 425 is part of a pump unit 420 and is guided so as to be movable in an axial manner in a pump unit housing 426. The pump pin 425 by way of the left-side end 425a thereof bears on the circumferential face 450 of the eccentric element 423 and by way of the opposite, right-side, end 425b contacts a pump piston 430. The pump piston 430 by way of a compression spring 440 is pretensioned in the direction of the pump pin 425 and in this suction phase shown in FIG. 6a thus includes a first piston face 452 that bears on the right-side end 425b of the pump pin 425. The pump pin 425 in this suction phase is moved radially outward into the pump housing 426 by the eccentric element 423, and therefore pushes the pump piston 430, counter to the pretension of the spring 440 against a second piston face 454, into the pump housing 426. On account of this movement, sealing fluid is suctioned through an axial passage duct 431 from the inlet opening 421 into an annular intermediate chamber 427, the volume of the latter being increased on account of the movement of the pump pin 425 and the pump piston 430. A pump piston valve 456 controls flow through the axial passage duct 431 in the pump piston 430, by means of a valve body 432 which is impinged by a spring 433, is closed or opened in an alternating manner as a function of the pressure conditions on the pump piston 430. The valve body 432, under the effect of a negative pressure on a valve body face 458 in the intermediate chamber 427, is pulled, counter to the spring pretensioned of the spring 433, to the open position and in the suction phase therefore enables the passage of sealing fluid through the axial passage duct 431 into an internal central duct portion 428 between the pump pin 425 and the pump piston 430.

Figure 6A:
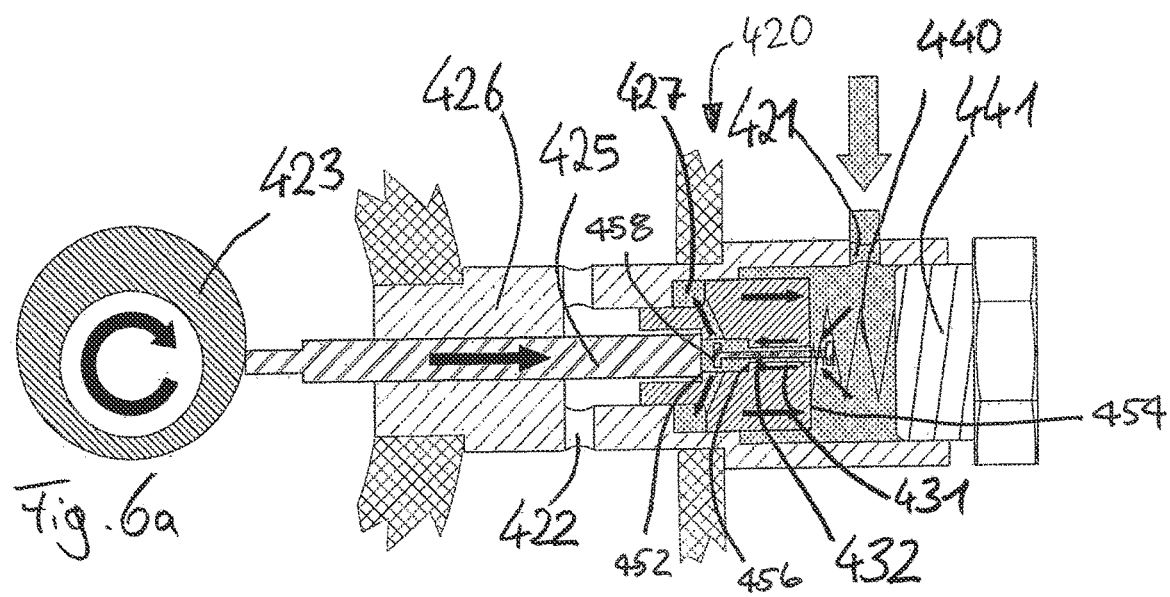
FIGS. 6a-e show a sequence of the pumping function of the pump device according to the invention.
Figure 6B:
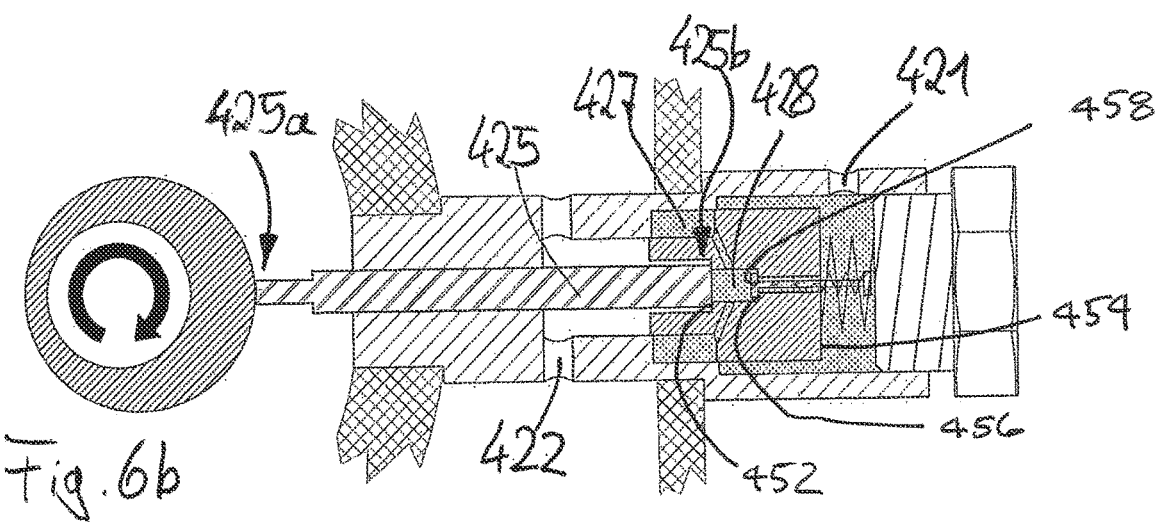

FIG. 6b shows the arrangement of the pump unit in the radially outer dead center. The intermediate chamber 427 is fitted to the maximum in this position; the axial passage duct 431 through the valve body 432 is closed by virtue of the now absent negative pressure in the intermediate chamber. The pump piston 430 by way of the pump pin 425 is held counter to the pressure of the spring 440 in the radially outermost position.

Figure 6C:
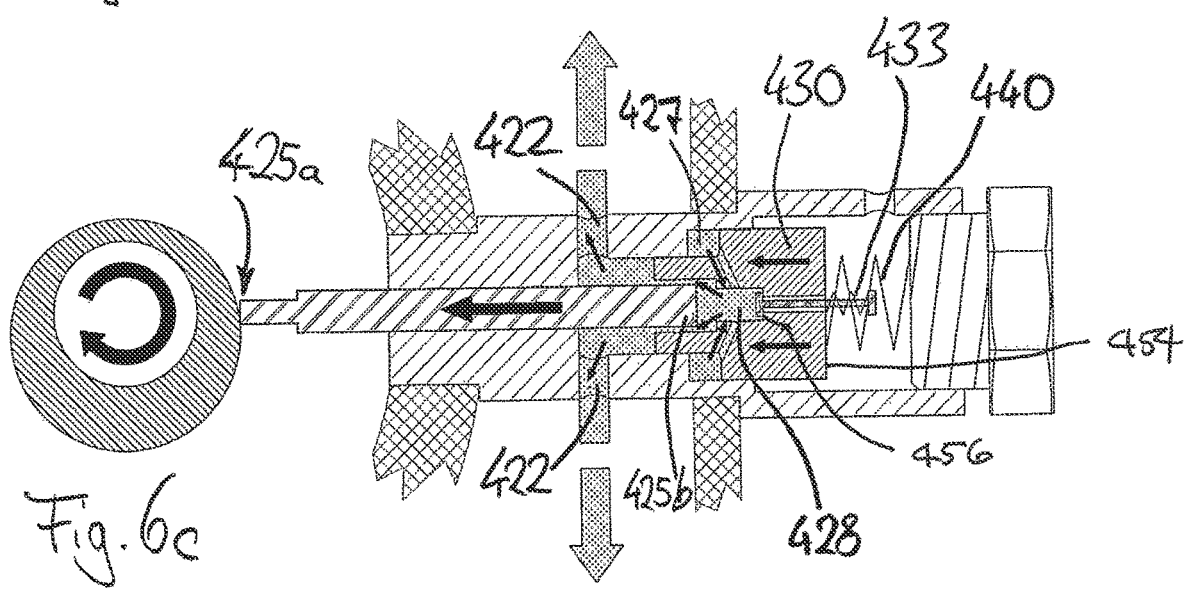

FIG. 6c shows the pump unit in the pressure phase. The pump pin 425 in said pressure phase is moved radially inward and on account thereof releases the pump piston 430 for a movement that is directed radially inward. The pump piston 430, on account of the spring pretension of the spring 440, is pushed radially inward and on account thereof builds up pressure in the intermediate chamber 427. The pump pin 425, on account of said positive pressure, is likewise pushed radially inward and consequently bears on the eccentric circumferential face. A gap space between the radially outward end of the pump pin 425 and the pump piston 430 is created by virtue of the higher resistance which counters the radial inward movement of the pump piston 430 as compared to the pump pin 425, fluid from the intermediate chamber 427 being able to flow through said gap space by way of the central duct portion 428 to the pump outlet 422. The fluid flowing out of the pump outlet puts the blocking chamber 390 under positive pressure. Said positive pressure can be adjusted by pretensioning the spring 440 by way of a setting device comprising an adjustment screw 441.

Figure 6D:
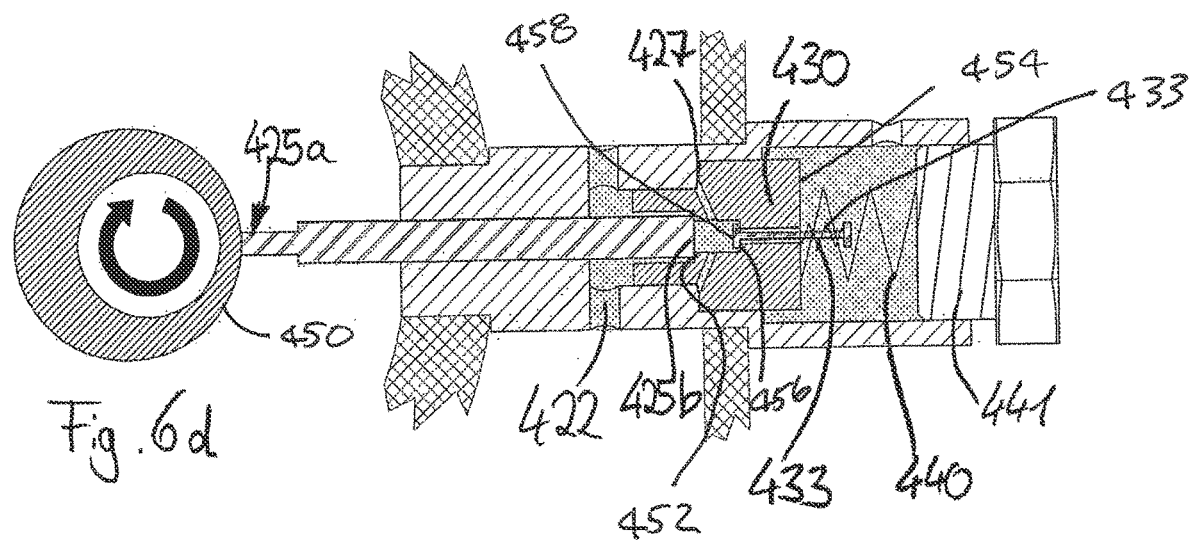

FIG. 6*d* shows the arrangement of the pump unit in the radially inner dead center. The intermediate chamber 427 in this position is completely emptied; the axial passage duct 431 through the valve body 432 is still closed by virtue of the still absent negative pressure in the intermediate chamber. The pump piston 430 is held so as to directly contact the radially outer end of the pump pin 425 by the pressure of the spring 440 in the radially innermost position.

Figure 6E:
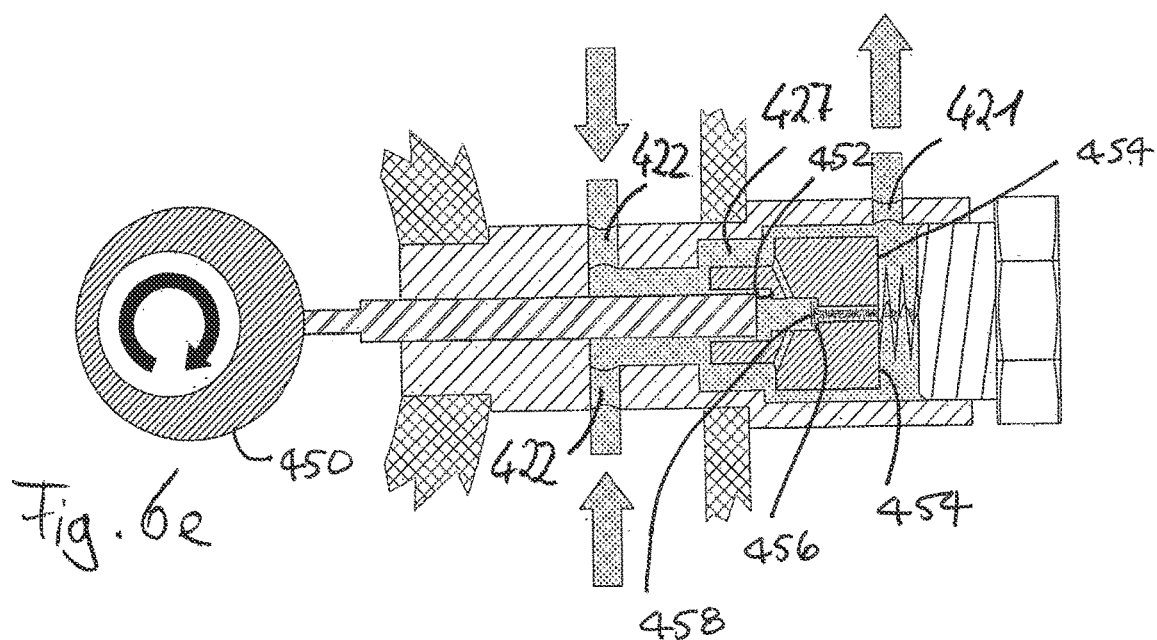

FIG. 6*e* shows the arrangement of the pump unit in a situation in which a positive pressure prevails in the blocking chamber. The positive pressure acts on the pump outlet 422 and, on account thereof, pushes the pump pin 425 radially inward onto the eccentric circumferential face, on the one hand, and pushes the pump piston 430 radially outward, counter to the spring pretension of the spring 440, on the other hand. On account of this radial outward movement of the pump piston 430, the latter is displaced so far that the passage of sealing fluid from the intermediate chamber 427 to the pump inlet 421 while bypassing the pump piston 430 in a radially outward manner is released. Sealing fluid can therefore flow directly from the blocking chamber 390 in the direction of the pump inlet 421, and the positive pressure can be reduced by discharging said sealing fluid into the inflow of the pump unit, thus for example into a sealing-fluid reservoir are that is connected thereto.

FIGS. 7 and 8 show a seal cartridge by way of which the seal assembly according to the invention can be produced and the wear parts of said seal assembly can be replaced or exchanged, respectively, in a simple and rapid manner. The seal cartridge comprises an inner sleeve 510 which is split into thus in the axial direction and which can be push-fitted onto a pump shaft of the rotary piston pump and be fastened in a torque-locking manner on said pump shaft, for example by way of a friction-fit or a form-fit. The sleeve 510 has a left axial part 510*a* having an external circumferential face on which the second shaft seal comprising a radial shaft seal ring 520 bears by way of the radially inward seal lip of said radial shaft seal ring 520 and effects sealing that is capable of moving in a relative manner. The first shaft seal comprises a right axial part 510*b* of the sleeve 510 interacts an external circumferential face of the sleeve 510 with a mechanical seal 530 which likewise effects sealing that is capable of moving in a relative manner in relation to an external circumferential face of the sleeve 510.

The radial shaft seal ring 520 acts on both sides and is held in a receptacle bush 540*a* so as to be stationary in a radially outward manner. The mechanical seal 530 is held in a receptacle bush 540*b* so as to be stationary in a radially outward manner. The receptacle bushes 540*a*, 540*b* have mutually aligned external circumferential faces which, sealed by seal rings 541, 542, can be fastened in a corresponding cylindrical receptacle in the housing of a rotary piston pump.

An eccentric disk 550 which is connected in a torque-locking manner to the sleeve 510 and which, when the seal cartridge is assembled around a pump shaft, conjointly rotates with said pump shaft and is disposed between the radial shaft seal ring 520 and the mechanical seal 530. The eccentric disk 550 serves for driving a pump unit by way of which a sealing fluid can be impinged with pressure and be conveyed.

The invention claimed is:

1. A seal assembly for sealing a pump shaft in a rotary piston pump configured for conveying pump-conveyed fluid, comprising:
    a sealing-fluid pump device having a pump inlet and a pump outlet; and
    a blocking chamber connected to the pump outlet and disposed so as to neighbor a pump chamber of the rotary piston pump, the blocking chamber being sealed in relation to the pump chamber by a first shaft seal that encloses the pump shaft;
    wherein the blocking chamber by way of the pump outlet of the sealing-fluid pump device is impinged with a fluid pressure resulting from a fluid pressure differential generated by the sealing-fluid pump device, whereby said fluid pressure interacts with the first shaft seal to seal the pump chamber in relation to the egress of pump-conveyed fluid from the pump chamber along the pump shaft; and
    wherein the sealing-fluid pump device, when exceeding a predetermined fluid pressure in the blocking chamber, is configured for releasing a passage of a sealing fluid from the pump outlet to the pump inlet and for opening an egress of the sealing fluid from the blocking chamber through the sealing-fluid pump device.

2. The seal assembly as claimed in claim 1, wherein the sealing-fluid pump device comprises:
    an eccentric element having an encircling eccentric circumferential face that is eccentric in relation to a rotation axis of the eccentric element and configured for a torque-locking connection to the pump shaft of the rotary piston pump that leads out of the pump chamber of the rotary piston pump; and
    a pump unit coupled to the eccentric element that upon rotation of the eccentric element generates the fluid pressure differential in a sealing fluid between the pump inlet and the pump outlet.

3. The seal assembly as claimed in claim 2, wherein the pump unit comprises:
    a pump pin which at a first pump pin end bears on the eccentric circumferential face of the eccentric element;
    a pump piston having a first piston face which interacts with a second pump pin end, and delimits a pump space that is connected to the pump outlet;
    a pretensioning element which interacts with a second piston face which in the piston longitudinal axis is disposed so as to be opposite the first piston face and elastically pretensions the pump piston in a radial manner in the direction toward the eccentric circumferential face; and
    an axial passage duct through the pump piston which connects the first piston face to the second piston face and which is closed by a pump piston valve which is pretensioned to a closed position;
    wherein the pump piston valve has a valve body having a valve body face which, upon the impingement of the first piston face with a negative pressure, causes an opening force on the valve body which is directed counter to the pretensioning element that acts in the closed position, and the elastic force of the pretensioning element exerts a force which acts on the pump piston and which exerts a fluid pressure on a fluid that is situated in the pump space.

4. The seal assembly as claimed in claim 1, wherein the blocking chamber is configured as a throughflow blocking chamber and has at least one mechanical seal, and the mechanical seal is lubricated by a fluid stream of the sealing fluid that results from the fluid pressure.

5. The seal assembly as claimed in claim 1, wherein the blocking chamber is configured as a closed blocking chamber, and a predetermined fluid pressure in the blocking chamber is maintained by the fluid pressure differential that is generated by the sealing-fluid pump device.

6. The seal assembly as claimed in claim 1, wherein the sealing-fluid pump device has a setting device for delimiting the fluid pressure that is generated in the blocking chamber.

7. The seal assembly as claimed in claim 1, wherein the pump inlet is connected to a fluid reservoir.

8. The seal assembly as claimed in claim 7, wherein the fluid reservoir is connected to the blocking chamber by way of a pressure check valve.

9. The seal assembly as claimed in claim 1, wherein a second blocking chamber disposed at another, spaced-apart, location seals the pump chamber in relation to the egress of pump-conveyed fluid, and wherein:
the pump inlet of the sealing-fluid pump device is connected to a fluid reservoir;
the blocking chamber is connected to the second blocking chamber; and
the blocking chamber, or the second blocking chamber, is connected to the reservoir by way of a check valve.

10. The seal assembly as claimed in claim 1, further comprising a control unit for controlling the pressure in the blocking chamber.

11. The seal assembly as claimed in claim 10, wherein the control unit is configured for initiating a pressure in the blocking chamber which is higher than a pressure prevailing in the pump chamber.

12. The seal assembly as claimed in claim 10, wherein the control unit is configured for increasing the pressure in the blocking chamber in response to a predetermined pressure in the pump chamber for a predetermined temporal period at predetermined temporal intervals or in predetermined operating states.

13. The seal assembly as claimed in claim 10, further comprising a leakage sensor for detecting a leakage from the blocking chamber, and wherein the control unit is in signal communication with the leakage sensor and, as a function of the sensor signal of the leakage sensor, initiates a pressure in the blocking chamber by increasing the pressure in the blocking chamber in the event of a leakage below a predetermined lower leakage limit value, or reducing the pressure in the blocking chamber in the event of a leakage above a predetermined leakage limit value.

14. The seal assembly as claimed in claim 1, wherein the first shaft seal is a mechanical seal.

15. The seal assembly as claimed in claim 1, wherein the first shaft seal is a mechanical seal configured for building up a hydrodynamically formed lubricating film.

16. The seal assembly as claimed in claim 1, further comprising a second shaft seal which encloses the pump shaft and seals the blocking chamber on a side that is opposite the first shaft seal.

17. The seal assembly as claimed in claim 16, wherein the second shaft seal is a radial shaft seal ring.

18. A rotary piston pump, comprising:
a pump chamber having a pump chamber inlet opening and a pump chamber outlet opening;
two mutually meshing rotary pistons which are fastened on two pump shafts that correspondingly run so as to be mutually parallel and which in a mutually opposing rotation convey a pump-conveyed fluid from the pump chamber inlet opening to the pump chamber outlet opening;
a drive mechanism which for driving the rotary pistons is coupled to at least one of the two pump shafts; and
a seal assembly comprising a blocking chamber disposed adjacent the pump chamber of the rotary piston pump, the blocking chamber being sealed in relation to the pump chamber by a first shaft seal that encloses a first of the two pump shafts and a second shaft seal that encloses a second of the two pump shafts;
wherein the blocking chamber is pressurized with a fluid pressure resulting from a fluid pressure differential generated by the sealing-fluid pump device, whereby said fluid pressure interacts with the first shaft seal and the second shaft seal to seal the pump chamber in relation to the egress of pump-conveyed fluid from the pump chamber along the pump shafts, such that said blocking chamber provides a seal between the drive mechanism and the pump chamber; and
wherein the sealing-fluid pump device, when exceeding a predetermined fluid pressure in the blocking chamber, is configured for releasing a passage of a sealing fluid from a sealing-fluid pump device outlet to a sealing-fluid pump inlet and for opening an egress of the sealing fluid from the blocking chamber through the sealing-fluid pump device.

19. The rotary piston pump as claimed in claim 18, wherein the drive mechanism has a synchronizing gear mechanism which for synchronizing the rotation of the two pump shafts is disposed in a gear mechanism space, and the seal assembly seals the gear mechanism space in relation to the pump chamber.

20. The rotary piston pump as claimed in claim 18, wherein the blocking chamber seals in relation to the egress of pump-conveyed fluid along the two pump shafts.

21. The rotary piston pump as claimed in claim 18, further comprising a second blocking chamber disposed at another, spaced-apart, location relative the blocking chamber, wherein:
the sealing-fluid pump device inlet is connected to a fluid reservoir;
the blocking chamber is connected to the second blocking chamber; and
the blocking chamber or the second blocking chamber is connected to the fluid reservoir by way of a check valve; and
wherein the second blocking chamber, opposite the blocking chamber, seals in relation to the egress of pump-conveyed fluid along the two pump shafts.

22. The rotary piston pump as claimed in claim 21, wherein the second blocking chamber is disposed between the pump chamber of the rotary piston pump and a mounting unit for the pump shafts of the rotary piston pump and seals said mounting unit in relation to the pump chamber, wherein a sealing lubrication fluid which is conveyed by the sealing-fluid pump device is disposed in the blocking chamber, and in that the sealing-fluid pump device outlet for conveying sealing lubrication fluid to the mounting unit is fluidically connected to the mounting unit.

23. A seal cartridge for a seal assembly for sealing a pump shaft in a rotary piston pump configured for conveying pump-conveyed fluid, the seal assembly comprising:
a sealing-fluid pump device having a pump inlet and a pump outlet; and
a blocking chamber connected to the pump outlet and disposed so as to neighbor a pump chamber of the rotary piston pump, the blocking chamber being sealed in relation to the pump chamber by a first shaft seal that encloses the pump shaft;
wherein the blocking chamber is pressurized with a fluid pressure resulting from a fluid pressure differential generated by the sealing-fluid pump device, whereby said fluid pressure interacts with the first shaft seal to seal the pump chamber in relation to the egress of pump-conveyed fluid from the pump chamber along the pump shaft; and wherein the seal cartridge comprises:

the first shaft seal having an internal circumferential face surrounding a passage opening for the pump shaft and configured for the sealed disposal in the manner of a relative movement about the pump shaft;

a second shaft seal having an internal circumferential face surrounding a passage opening for the pump shaft and configured for the sealed disposal in the manner of a relative movement about the pump shaft; and an activation element disposed between the first shaft seal and the second shaft seal and coupled in a torque-locking manner to the pump shaft, and having an activation face for the sealing-fluid pump device.

24. The seal cartridge as claimed in claim 23, wherein the first shaft seal or the second shaft seal is configured as a mechanical seal or a radial shaft seal ring.

25. The seal cartridge as claimed in claim 23, wherein the sealing-fluid pump device comprises:

an eccentric element having an encircling eccentric circumferential face that is eccentric in relation to a rotation axis of the eccentric element and configured for a torque-locking connection to the pump shaft of the rotary piston pump that leads out of the pump chamber of the rotary piston pump; and a pump unit which is coupled to the eccentric element that upon rotation of the eccentric element generates the fluid pressure differential in a sealing fluid between the pump inlet and the pump outlet.

26. A seal assembly for sealing a pump shaft in a rotary piston pump configured for conveying pump-conveyed fluid, comprising:

a sealing-fluid pump device having a pump inlet and a pump outlet;

a blocking chamber connected to the pump outlet and disposed so as to neighbor a pump chamber of the rotary piston pump, the blocking chamber being sealed in relation to the pump chamber by a first shaft seal that encloses the pump shaft;

an eccentric element having an encircling eccentric circumferential face that is eccentric in relation to a rotation axis of the eccentric element and configured for a torque-locking connection to the pump shaft of the rotary piston pump that leads out of the pump chamber of the rotary piston pump; and a pump unit which is coupled to the eccentric element and upon rotation of the eccentric element generates a fluid pressure differential in a sealing fluid between the pump inlet and the pump outlet;

wherein the blocking chamber by way of the pump outlet of the sealing-fluid pump device is impinged with a fluid pressure resulting from the fluid pressure differential generated by the sealing-fluid pump device, whereby said fluid pressure interacts with the first shaft seal to seal the pump chamber in relation to the egress of pump-conveyed fluid from the pump chamber along the pump shaft.

27. The seal assembly as claimed in claim 26, wherein the pump unit comprises:

a pump pin which at a first pump pin end bears on the eccentric circumferential face of the eccentric element;

a pump piston having a first piston face which interacts with a second pump pin end, and delimits a pump space that is connected to the pump outlet;

a pretensioning element which interacts with a second piston face which in the piston longitudinal axis is disposed so as to be opposite the first piston face and elastically pretensions the pump piston in a radial manner in the direction toward the eccentric circumferential face; and an axial passage duct through the pump piston which connects the first piston face to the second piston face and which is closed by a pump piston valve which is pretensioned to a closed position;

wherein the pump piston valve has a valve body having a valve body face which, upon the impingement of the first piston face with a negative pressure, causes an opening force on the valve body which is directed counter to the pretensioning element that acts in the closed position, and the elastic force of the pretensioning element exerts a force which acts on the pump piston and which exerts a fluid pressure on a fluid that is situated in the pump space.

28. A seal assembly for sealing a pump shaft in a rotary piston pump configured for conveying pump-conveyed fluid, comprising:

a sealing-fluid pump device having a pump inlet and a pump outlet;

a blocking chamber connected to the pump outlet and disposed so as to neighbor a pump chamber of the rotary piston pump, the blocking chamber being sealed in relation to the pump chamber by a first shaft seal that encloses the pump shaft; and a control unit for controlling a fluid pressure in the blocking chamber;

wherein the blocking chamber by way of the pump outlet of the sealing-fluid pump device is impinged with the fluid pressure resulting from a fluid pressure differential generated by the sealing-fluid pump device, whereby said fluid pressure interacts with the first shaft seal to seal the pump chamber in relation to the egress of pump-conveyed fluid from the pump chamber along the pump shaft; and wherein the control unit is configured for increasing the fluid pressure in the blocking chamber in response to a predetermined pressure in the pump chamber for a predetermined temporal period at predetermined temporal intervals or in predetermined operating states.

29. A seal assembly for sealing a pump shaft in a rotary piston pump configured for conveying pump-conveyed fluid, comprising:

a sealing-fluid pump device having a pump inlet and a pump outlet;

a blocking chamber connected to the pump outlet and disposed so as to neighbor a pump chamber of the rotary piston pump, the blocking chamber being sealed in relation to the pump chamber by a first shaft seal that encloses the pump shaft;

a control unit for controlling a fluid pressure in the blocking chamber; and a leakage sensor for detecting a leakage from the blocking chamber;

wherein the blocking chamber by way of the pump outlet of the sealing-fluid pump device is impinged with the fluid pressure resulting from a fluid pressure differential generated by the sealing-fluid pump device, whereby said fluid pressure interacts with the first shaft seal to seal the pump chamber in relation to the egress of pump-conveyed fluid from the pump chamber along the pump shaft; and wherein the control unit is in signal communication with the leakage sensor and, as a function of the sensor signal of the leakage sensor, initiates the fluid pressure in the blocking chamber by increasing the fluid pressure in the blocking chamber in the event of a leakage below a predetermined lower leakage limit value, or reducing the fluid pressure in the blocking chamber in the event of a leakage above a predetermined leakage limit value.

* * * * *